United States Patent [19]

Kumazawa

[11] Patent Number: 4,735,105

[45] Date of Patent: Apr. 5, 1988

[54] TRANSMISSION AND DRIVE ARRANGEMENT FOR VEHICLE

[75] Inventor: Toshiharu Kumazawa, Iwata, Japan

[73] Assignee: Yamaha Hatsudoki Kabushiki Kaisha, Japan

[21] Appl. No.: 664,709

[22] Filed: Oct. 25, 1984

[30] Foreign Application Priority Data

Nov. 4, 1983 [JP] Japan ................. 58-205926

[51] Int. Cl.[4] ............................................. F16H 3/08
[52] U.S. Cl. ........................................ 74/378; 74/476; 74/701
[58] Field of Search ................. 180/230, 215; 74/378, 74/355, 323, 359, 477, 701, 700, 694, 475, 476; 192/21

[56] References Cited

U.S. PATENT DOCUMENTS

| | | | |
|---|---|---|---|
| 1,553,147 | 9/1925 | Dodge | 74/694 |
| 2,150,150 | 3/1939 | Burrows et al. | 74/378 X |
| 2,254,104 | 8/1941 | Joy | 192/21 X |
| 2,668,451 | 2/1954 | Hjulian | 74/323 |
| 2,819,623 | 1/1958 | Mosny | 74/355 |
| 3,052,313 | 9/1962 | Hooven | 74/694 X |
| 3,213,958 | 10/1965 | Muller | 74/694 |
| 3,987,686 | 10/1976 | Paplaski | 74/476 |
| 4,416,348 | 11/1983 | Fukui | 180/215 X |
| 4,427,088 | 1/1984 | Tsuboi | 74/359 X |
| 4,441,379 | 4/1984 | Malkowski | 74/477 |
| 4,474,072 | 10/1984 | Hallenstvedt | 74/378 |
| 4,510,816 | 4/1985 | Linden | 74/378 |
| 4,531,422 | 7/1985 | Yarnell | 74/475 |
| 4,635,506 | 1/1987 | Imaizumi et al. | 74/359 X |

FOREIGN PATENT DOCUMENTS

| | | | |
|---|---|---|---|
| 48980 | 7/1934 | Denmark | 192/21 |
| 805738 | 5/1951 | Fed. Rep. of Germany | 74/359 |
| 1132172 | 3/1957 | France | 74/745 |
| 161340 | 10/1982 | Japan | 74/476 |

Primary Examiner—Lawrence Staab
Assistant Examiner—Dwight G. Diehl
Attorney, Agent, or Firm—Ernest A. Beutler

[57] ABSTRACT

An improved driving arrangement for a four wheel off the road vehicle having a combined engine and transmission with the engine output shaft and transmission primary and secondary shafts extending transversely relative to the longitudinal axis of the vehicle. An auxiliary transmission having a pair of driven bevel gears rotating in opposite directions is affixed to the side of the main transmission and embodies a dog clutching arrangement for selectively clutching either of the bevel gears to a drive shaft that drives the rear axle of the vehicle. An interlock arrangement is incorporated so as to prevent shifting of the change speed transmission out of neutral or first gear when the auxiliary transmission is in reverse and for preventing shifting of the auxiliary transmission into reverse except when the change speed transmission is in neutral or low gear. In addition, an overload release device is incorporated in the driving arrangement for protecting the transmission from undue loads.

11 Claims, 6 Drawing Sheets

TRANSMISSION AND DRIVE ARRANGEMENT FOR VEHICLE

BACKGROUND OF THE INVENTION

This invention relates to a transmission and drive arrangement for vehicles and more particularly to an improved transmission arrangement for off the road vehicles embodying a reverse gear.

Off the road vehicles embodying balloon tires and designed primarily for a single rider are enjoying great popularity. Because of the off the road application, it has been the practice to employ three or four wheeled vehicles of this type to obtain improved stability. However, because of the compact nature of such vehicles, it has been the practice to use an engine and driving arrangement similar to that from a motorcycle wherein the transmission assembly of the vehicle is incorporated in the engine crankcase and the transmission shafts extend parallel to the rotational axis of the output shaft of the engine and transversely to the longitudinal axis of the vehicle. However, with off the road vehicles as with motorcycles, it is desirable to employ shaft drives in some situations. Therefore, it is necessary for the transmission and driving arrangement to provide a mechanism for transferring the drive from a transversely extending transmission output shaft to a longitudinally extending drive shaft. Furthermore, when the vehicle is provided with three or four wheels, it is also desirable to incorporate a reverse gear mechanism for driving the vehicle rearwardly. However, it is very difficult to provide such a reverse arrangement in a transmission that is contained with the crankcase without the engine transmission assembly becoming unduly bulky. An improved transmission and drive assembly embodying a reverse gear mechanism is dislosed in the copending patent application entitled "Transmission For Motor Three-Wheelers", Ser. No. 575,050, filed Jan. 30, 1984 in the name of Shinji Terashita and assigned to the assignee of this application. It is an object of this invention to provide a further improved transmission of this general type.

It is, therefore, a principal object of this invention to provide an improved transmission and drive arrangement for off the road vehicles that incorporates a simplified and compact reverse drive arrangement.

It is a further object of this invention to provide an improved and simplified compact reverse transmission assembly for off the road vehicles.

SUMMARY OF THE INVENTION

This invention is adapted to be embodied in a transmission mechanism for the driven wheels of a wheeled vehicle that comprises a change speed transmission having an output shaft and a driving gear fixed for rotation with the output shaft. A drive shaft for driving a wheel of the vehicle is associated with a pair of gears supported for relative rotation. Means are provided for driving the gears of the pair from the driving gear for rotation in opposite directions relative to the drive shaft. Clutch means are provided for selectively clutching one of the gears of the pair for rotation with the drive shaft for driving the drive shaft in selected directions.

In accordance with one feature of the invention, interlock means are provided between the clutch means and the change speed transmission for precluding shifting of the clutch means from a forward position to a reverse position unless the change speed transmission is in a preselected gear.

In accordance with another feature of the invention, an overload release device is interposed between the pair of gears and the driven wheel of the vehicle.

DETAILED DESCRIPTION OF THE PREFERRED EMBODIMENTS

Figure 1:
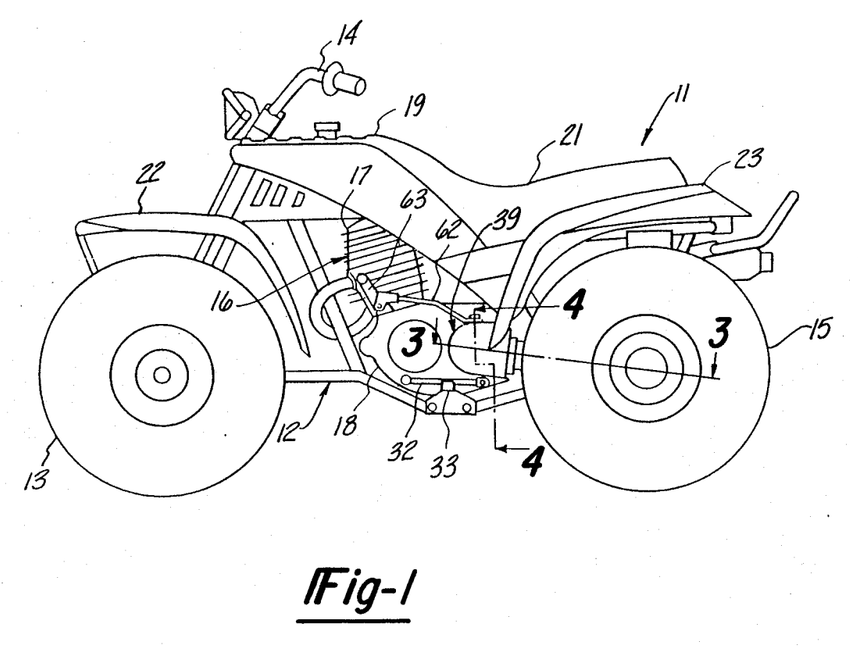
FIG. 1 is a side elevational view of an off the road vehicle embodying a transmission and drive mechanism constructed in accordance with an embodiment of the invention.
Figure 2:
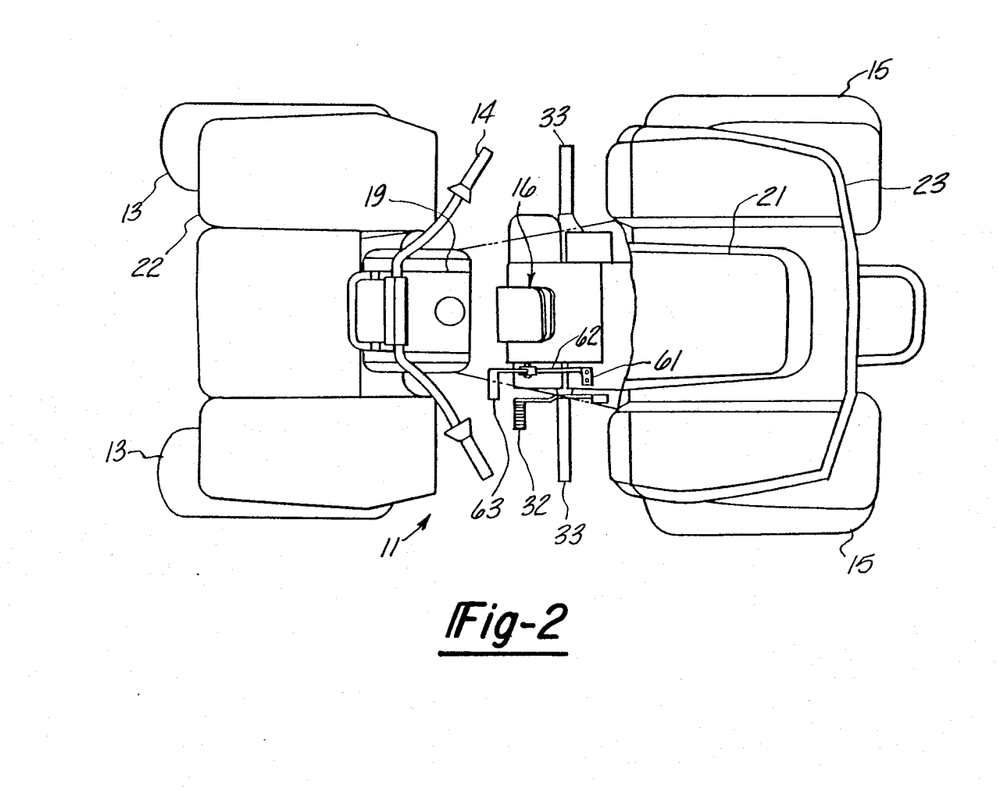
FIG. 2 is a top plan view of the vehicle.

Referring first primarily to FIGS. 1 and 2, an off the road vehicle constructed in accordance with an embodiment of the invention is identified generally by the reference numeral 11. The vehicle 11 includes a frame assembly, indicated generally by the reference numeral 12, which may be of any known type and, in the illustrated embodiment, is of the welded up type. In the illustrated embodiment, a pair of front wheels carrying balloon tires 13 are supported at the forward end of the frame assemby 12 for steering movement. A handlebar assembly 14 is provided for steering of the front wheels 13. Although the invention is illustrated and described in conjunction with a four wheel vehicle embodying a pair of front wheels, it is to be understood that certain aspects of the invention may be employed in connection with three wheel vehicles or vehicles having still other numbers of wheels.

A pair of rear wheels carrying balloon tires 15 are supported at the rear end of the frame assembly 12. The rear wheels 15 are driven, in a manner to be described, and may be rigidly suspended from the frame 12. Because of the use of the low pressure balloon tires on the wheels 13 and 15, any suspension system for these wheels may be unnecessary. It is to be understood, however, that the invention or at least some aspects of it are equally applicable to vehicles having suspensions.

A combined engine and transmission asembly, indicated generally by the reference numeral 16 is provided for powering the vehicle and driving the rear wheels 15. This engine transmission assembly includes an internal combustion engine 17 and a combined crankcase transmission assembly 18, the details of which will become more apparent when reference is made to the remaining figures.

A fuel tank 19 is supported by the frame assembly 12 forwardly of a seat 21 which is also supported upon the frame assembly 12. The seat 21 is primarily designed for a single rider. However, it is extended so as to accommodate occasionally more than one person. In addition, a body assembly is further provided that includes a pair of front fenders 22 that overlie the front wheels 13 and a rear fender assembly 23 that overlies the rear wheels 15.

Referring now additionally to FIGS. 3 through 6 and primarily to these figures, the engine 17 in the illustrated embodiment is of the reciprocating, single cylinder type and drives a crankshaft 24 that extends transversely to the longitudinal axis of the vehicle 11. A pair of transfer gears 25 transmits drive from the crankshaft 24 to a clutch assembly 26 which, in turn, selectively drives a primary shaft 27 of the transmission that is contained within the combined transmission crankcase assembly 18. The primary shaft 27 extends parallel to the axis of rotation of the crankshaft 24 and, accordingly, transversely to the longitudinal center line of the vehicle 11. A transmission secondary shaft 28 is journaled in the combined crankcase transmission assembly 18 for rotation about an axis parallel to the axis of the transmission primary shaft and the crankshaft rotational axis.

A plurality of intermeshing gear sets providing different ratios 29 are carried by the transmission primary and secondary shafts 27 and 28 and are selectively couplable to the respective shafts for driving the secondary shaft 28 at a preselected speed raito relative to the primary shaft 27 and engine crankshaft 24. The mechanism for so coupling the gear sets 29 to their respective shafts 27, 28 includes a shifting cam assembly 31 that is supported for rotation about an axis that is parallel to and below the axis of the secondary shaft 28 and which is selectively operated by means of a transmission controlling foot pedal 32 (FIGS. 1 and 2) that is juxtaposed to one of a pair of foot pedals 33 carried by the frame assembly 12. Shifting forks 34 are slidably supported on a rod 35 and cooperate with dog clutches associated with the gear sets 29 for accomplishing the shifting in a known manner, for example, that shown in the aforenoted copending application.

Figure 3:
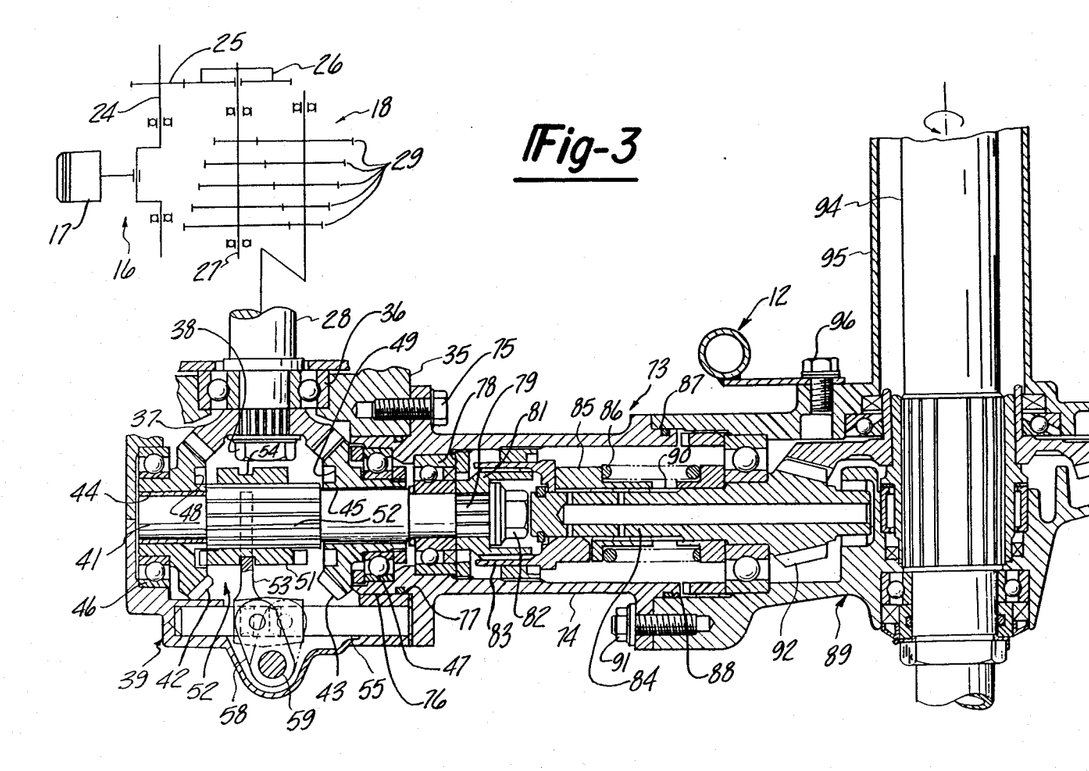
FIG. 3 is a partially schematic cross-sectional view showing the engine, transmission and rear wheel driving arrangement, taken generally along the line 3—3 of FIG. 1.
Figure 4:
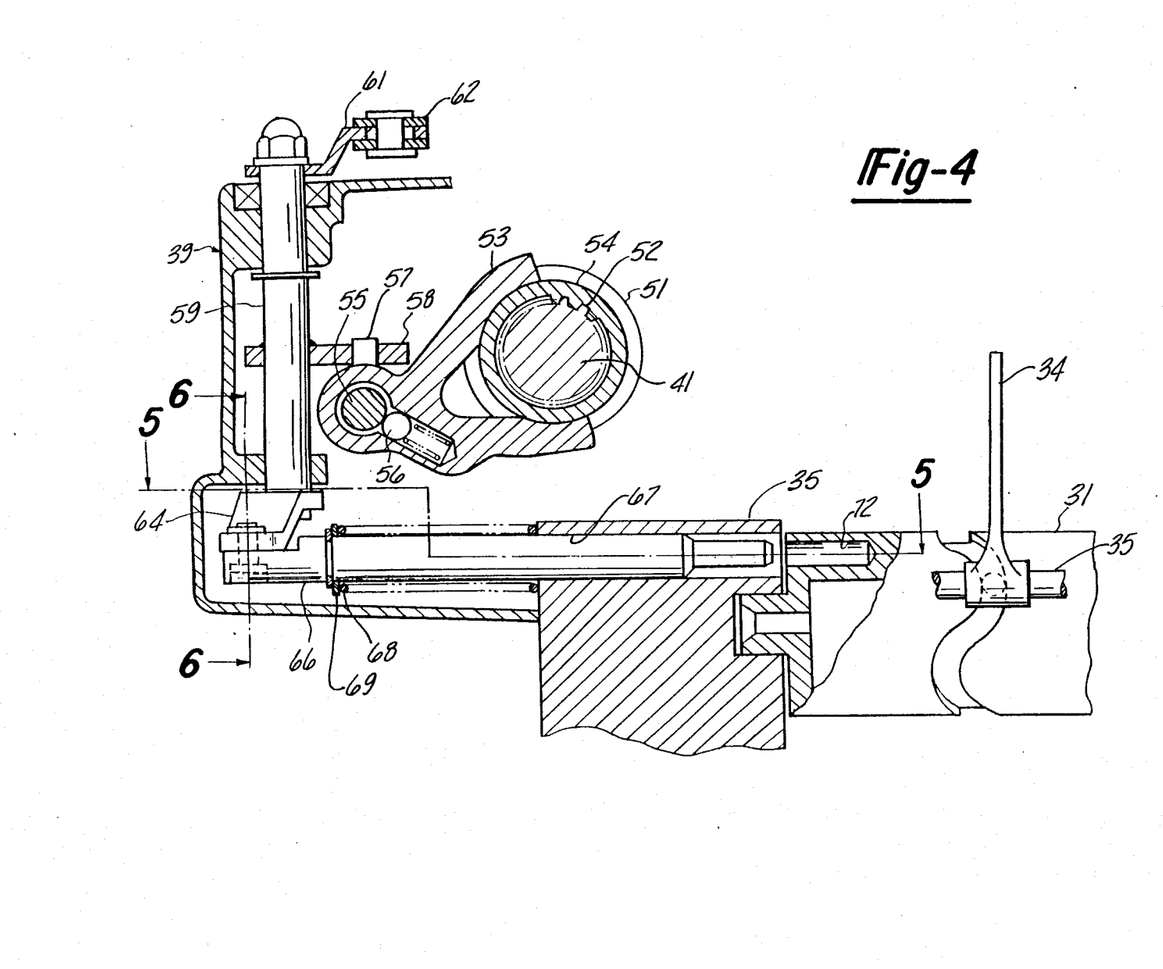
FIG. 4. is a cross-sectional view taken generally along the line 4—4 of FIG. 1.

The transmission secondary shaft 28 has an end portion that extends outwardly through an opening formed in a casing 35 of the combined engine crankcase transmission assembly 18. This portion of the secondary shaft 28 is journaled by means of an anti-friction bearing 36 supported adjacent this opening in the case 35. A driving bevel gear 37 is affixed to a splined portion of this shaft 28 by means including a nut 38.

An auxiliary transmission case, indicated generally by the reference numeral 39, is affixed to the main transmission case 35 in an appropriate manner and encloses the bevel gear 37. An intermediate shaft 41 is supported within the auxiliary transmission casing 39 and extends longitudinally of the vehicle 11 and perpendicularly to the transmission secondary shaft 28. A forward bevel gear 42 and a reverse bevel gear 43 are journaled for rotation relative to the intermediate shaft 41 by means of plain bearings 44 and 45. The bevel gears 42 and 43 are in mesh with the driving bevel gear 37 on opposite sides of it. As a result, the forward bevel gear 42 will be rotatably driven in the opposite direction from the reverse bevel gear 43 by the driving gear 37.

The forward bevel gear is supported within the auxiliary transmission casing 39 by means of an anti-friction bearing 46. In a like manner, the reverse bevel gear 43 is supported, in a manner to be described, by a similar anti-friction bearing 47. As a result, the intermediate shaft 41 is rotatably journaled by the gears 42 and 43 via the bearings 46 and 47, and 44 and 45.

The forward and reverse bevel gears 42 and 43 are provided with respective dog clutching recesses 48 and 49 that are adapted to be engaged by coresponding teeth formed at opposite ends of a dog clutching sleeve 51. The dog clutching sleeve 51 has internal splines that are engaged with external splines 52 formed on the intermediate shaft 41 between the areas where this shaft is engaged by the plain bearings 44 and 45.

The construction consisting of the forward and reverse bevel gears 42 and 43 and the dog clutching sleeve 51 comprises a forward, reverse transmission assembly, that is indicated generally by the reference numeral 52 and which is positioned within the auxiliary transmission case 39. Shifting is accomplished by means of a shifting fork 53 that is engaged within a cylindrical recess 54 of the sleeve 51. The shifting fork 53 is, in turn, slidably supported on a rod 55 that extends parallel to the axis of rotation of the intermediate shaft 41 and which rod is supported in the auxiliary transmission case 39. The shifting fork 53 carries a detent mechanism 56 that is cooperable with recesses formed in the shaft 55 so as to selectively retain the dog clutching sleeve 51 either in engagement with the forward bevel gear 41 as shown in the solid line view of the figures or in engagement with reverse bevel gear 43.

The shift fork 53 has an upwardly extending pin 57 that is received in an opening in a shift arm 58. The shift arm 58 is, in turn, affixed to a shifting shaft 59 that is vertically disposed in the auxiliary transmission casing 39 and which extends through it at its upper end.

Affixed to the upper end of the shift shaft 59 is a lever 61. The lever 61 is pivotally connected by a pivot pin to one end of a shift link 62. The forward end of the shift link 62 is connected to a shifting foot lever 63, which foot lever is rotatable from a forward position in a clockwise direction as shown in FIG. 1, to a rearwardly disposed reverse position wherein the shift fork 53 is moved rearwardly so as to engage the sleeve 51 with the reverse gear 43. Shifting into forward gear is obtained by rotating the shift lever 63 back in a forward direction.

Figure 5:
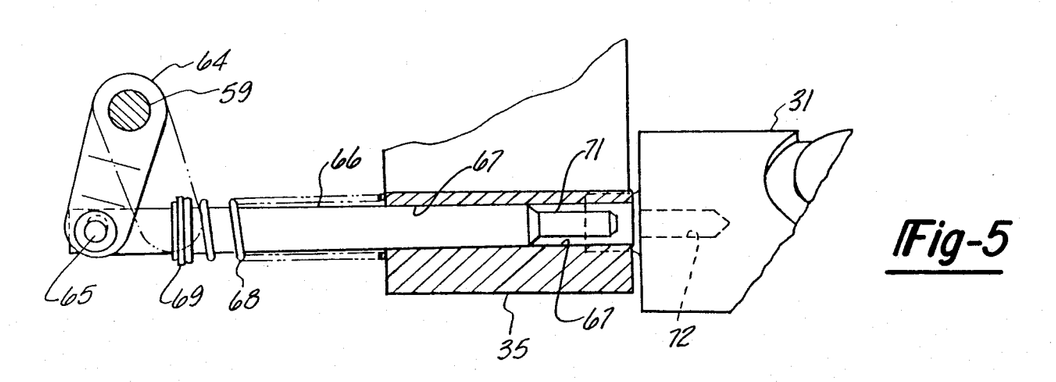
FIG. 5 is a cross-sectional view taken along the line 5—5 of FIG. 4.
Figure 6:
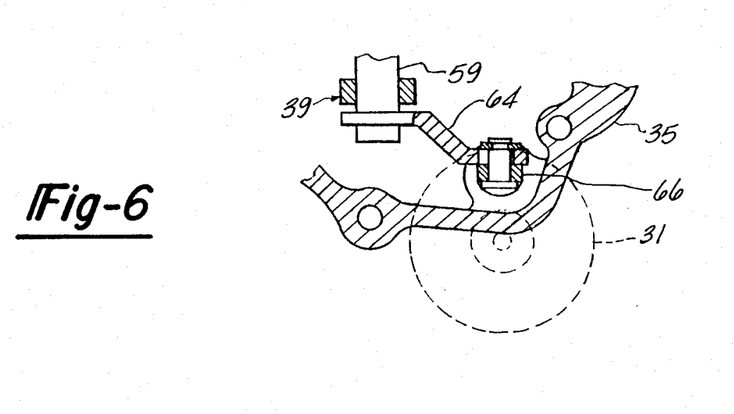
FIG. 6 is a cross-sectional view taken along the line 6—6 of FIG. 4.

An arrangement is provided for preventing the shifting of the transmission 58 into reverse except when the primary transmission 18 is in either neutral or low gear and also for preventing shifting of the primary transmission 18 out of neutral or low gear when the transmission 58 is in reverse. This mechanism includes a further lever 64 that is affixed to the lower end of the shifting shaft 59 and contained within the auxiliary transmission casing 39. The lever 64 is connected by means of a pin 65 to one end of a slidably supported blocking pin 66. The blocking pin 66 is supported for sliding movement in a bore 67 of the main transmission case 35. A coil compression spring 68 extends around the exposed end of the pin 66 and engages the transmission case 35 and a washer 69 that is staked to the pin 66 for urging the pin 66 to a retracted position.

The inner end of the pin 66 has a reduced diameter portion 71 that is adapted to enter into an appropriately shaped opening 72 formed in the cam 31 and which is aligned with its neutral and first gear position so as to preclude further rotation of the cam 31 so as to prevent shifting into a gear other than neutral or low gear when the transmission 52 is in reverse. That is, when the shaft 59 has been rotated so as to move the fork 53 to engage the dog clutching sleeve 51 with the reverse gear 43, the pin 66 will be extended so that its portion 71 enters the opening 72. Thus, further rotation of the cam 31 will be precluded.

In a somewhat similar manner, if the transmission 18 is in other than first gear or neutral, the cam 31 will be rotated so that the opening 72 will not be aligned with the pin end portion 71. Therefore, any attempt by the operator to move the lever 63 in a rearward direction from forward drive of the transmission 52 will be precluded by enggement of the pin end 71 with the adjacent face of the cam 73. Therefore, the desired interlock is provided.

The intermediate shaft 41 is in driving relationship with a drive shaft assembly, indicated generally by the reference numeral 73. The drive shaft assembly 73 includes an outer housing or tube 74 that is affixed at its forward end to the rear end of the auxiliary transmission casing 39 by means of bolts 75. The housing assembly 74 has a forward pilot portion 76 that extends into a bore 77 formed in the auxiliary transmission casing 39. The bearing 47 is supported within this pilot portion 76. In addition, an anti-friction bearing 78 is carried directly adjacent the pilot portion 76 and further rotatably journals the rear end of the intermediate shaft 41. This end of the intermediate shaft 41 is splined, as at 79, so as to receive a female splined portion of a splined sleeve 81. The splined sleeve 81 is axially fixed to the shaft 41 by means including a nut 82. The sleeve 81 also has external sleeve that are engaged with internal sleeve of a further spline member 83. The spline member 83 is journaled upon a drive shaft 84. The drive shaft 84 is, in turn, splined 90 and these splines 90 are engaged with a sleeve 85 that is axially movable and non-rotatably affixed to the drive shaft 84. The sleeve 85 has forwardly extending projections that are urged into engagement with corresponding recesses of the splined member 83 by means of a coil compression spring 86 so as to provide an overload release coupling between the drive shaft 84 and the splined member 83.

The rear end of the tube 74 is provided with a pilot portion 87 that extends into a corresponding bore 88 of a final drive housing, indicated generally by the reference numeral 89. The final drive housing 89 is affixed to the tube 74 by means of a plurality of bolts 91.

The drive shaft 84 carries an integral pinion gear 92 that is positioned within the final drive housing 89 and which meshes with a ring gear 93. The ring gear 93 is journaled within the final drive housing 89 and is splined to a rear axle 94 that is journaled within the final drive housing 89 and within an axle tube 95 that is affixed in an appropriate manner to the final drive housing 89. The rear wheels 15 are affixed, in a suitable manner, to the rear axle 94. The final drive housing 89, as has been described, is rigidly affixed to the frame assembly 12 as by means of bolts 96.

Figure 7:
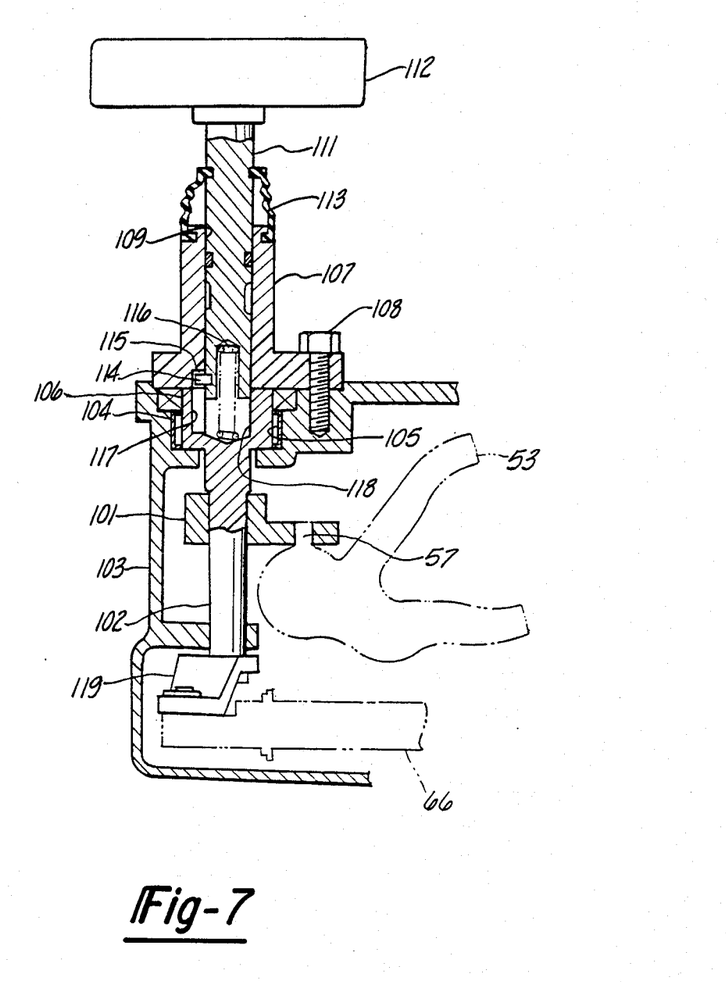
FIG. 7 is a cross-sectional view, in part similar to FIG. 4, showing another embodiment of the invention.

FIG. 7 illustrates another embodiment of the invention which differs from the embodiment of FIGS. 1 through 6 only in the mechanism for shifting the auxiliary transmission mechanism 52. That is, the shift fork 53 and its relationship to the remaining components of the transmission are the same in this embodiment as in the previously descirbed embodiment. For this reason, the remaining elements of the transmission have not been illustrated nor will they be described in conjunction with this embodiment.

The shift fork 53 has its upwardly extending pin portion 57 received in an opening in a shift lever 101. The shift lever 101 is, in turn, affixed to a shifting shaft 102 that is journaled in an auxiliary transmission casing 103 for rotation about a generally vertically extending axis. This rotational support is provided by means of a roller bearing assembly 104 that is contained within a counterbore 105 formed at the top portion of the auxiliary transmission casing 103 and which journals an enlarged portion 106 of the shaft 102.

A sleeve member 107 is affixed to the upper portion of the auxiliay transmission case 103 by means of bolts 108. The sleeve 107 has an internal bore 109 that slidably supports a shift actuator 111. The shift actuator 111 carries a knob 112 at its upper end for rotation and axial movement of it. A flexible boot 113 is carried at the upper end of the sleeve 107 and sealingly engages the exposed portion of the actuator 111.

The actuator 111 carries a radially extending pin 114 at its lower end. The pin 114 is normally urged into engagement with a recess 115 formed in the sleeve 107 by means of a coil compression spring 116. When the auxiliary transmission 52 is shifted in its forward drive position, the recess 115 and pin 114 will be aligned with a mating keyway 117 that is formed in an internal bore 118 of the enlarged portion 106 of the shift shaft 102. It should be noted that the spring 116 is also interposed in part in this bore.

If it is desired to shift the transmission into reverse from the position shown in FIG. 7, the knob 112 and actuator 111 are first moved axially downwardly to bring the pin 114 into engagement with the keyway 117. The actuator 111, knob 112 and shift shaft 114 may then be rotated in a reverse direction so as to move the fork 53 to shift the auxiliary transmission 52 into reverse. When in reverse, the coil spring 116 will urge the pin 114 and actuator 111 upwardly. However, since the keyway 117 is no longer aligned with the notch 115, it will be impossible for the actuator 111 to be moved fully out of engagement with the shaft 102 and the operator will be warned that the transmission is in reverse by the rotated position of the knob 112 and its depressed condition. If the transmission is again shifted into forward, the spring 116 can urge the actuator 111 upwardly so that the pin 114 will enter the notch 115 and the transmission 52 will be retained in forward.

As with the previously described embodiment, an interlock is provided with the main transmission which interlock is comprised of a lever 119 carried at the lower end of the shift shaft 102 and operatively connected to the pin 66 as in the previously described embodiment.

It should be readily apparent from the foregoing description that an extremely effective and compact forward, reverse transmission is provided for vehicles having main transmission shafts that are disposed perpendiculaly to the axis of the drive shaft. An improved shifting mechanism is also incorporated for this transmission and two embodiments of activating mechanisms for the shift mechanism have been disclosed. In additional to these two embodiments, various changes and modifications may be made without departing from the spirit and scope of the invention, as defined by the appended claims.

I claim:

1. A transmission mechanism for the driven wheels of a wheeled vehicle comprising a combined engine transmission assembly including an internal combustion engine having a crankcase transmission assembly including a crankshaft rotatably journaled therein, a change speed transmission contained within said crankcase transmission assembly and having an extending portion of an output shaft extending therefrom, said change speed transmission comprising a pair of intermeshing gears of different ratios operably connecting said crankshaft with said output shaft for establishing differnt ratios of rotational speed of said output shaft relative to said crankshaft and shifting means therefore comprising an element rotatable to preselected positions depending on the selected ratio, a driving gear affixed for rotation with the extending portion of said output shaft, a drive shaft for diving a wheel of said vehicle, a pair of gears journaled for rotation relative to said drive shaft and externally of said crankcase transmission assembly, means for driving said pair of gears from said driving gear for rotation in opposite directions relative to said drive shaft, means including clutch means for selectively clutching either of said pair of gears for rotation with said drive shaft for driving said drive shaft in selected directions, and interlock means for precluding shifing of said clutch means form a forward driven position to a reverse drive position unless said change speed transmission is in a preselected gear comprising a crank shape member operably connected to said clutch means for operating said clutch means in response to pivotal movement of said crank shape member, a manual operator for selectively rotating said crank shape member, a plunger member supported for reciprocation, means for positively reciprocating said plunger member upon rotation of said crank member, and detent opening means formed in said rotatable element to receive said plunger member when said rotatable element is in a predetermined angular position for limiting further rotation of said rotatable element when said plunger member is in engagement with said detent opening and for preventing privotal movement of said crank shape member when said rotatable member is not in a predetermined angular position.

2. A transmission mechanism as set forth in claim 1 wherein the associated vehicle has a rear axle carrying a pair of balloon tired wheels and which is driven by the drive shaft.

3. A transmission mechanism as set forth in claim 2 wherein the driven wheels are both affixed to the axle.

4. A transmission mechanism as set forth in claim 2 further including overload release means interposed between the driving gear and the rear axle.

5. A transmission mechanism as set forth in claim 1 wherein the combined crankcase transmission assembly has a main casing with its output shaft extending through one side thereof, the pair of gears being journaled for rotation within a auxiliary transmission casing that is affixed to said main casing and which encloses the exposed end of said output shaft.

6. A transmission mechanism as set forth in claim 1 further including an intermediate shaft rotatably supporting the pair of gears and in driving relationship with the drive shaft, said pair of gears comprising a pair of spaced apart bevel gears, the driving gear comprising a bevel gear intermeshed with said pair of gears with said pair of gears being axially spaced apart, the clutch comprising a dog clutch splined to said intermediate shaft and positioned between said pair of bevel gears.

7. A transmission mechanism as set forth in claim 6 wherein the associated vehicle has a rear axle carrying a pair of balloon tired wheels and which is driven by the drive shaft.

8. A transmission mechanism as set forth in claim 7 wherein the driven wheels are both affixed to the axle.

9. A transmission mechanism as set forth in claim 7 further including overload release means interposed between the driving gear and the rear axle.

10. A transmission mechanism as set forth in claim 6 wherein the combined crankcase transmission assembly has a main casing with its output shaft extending through one side thereof, the pair of gears being journaled for rotation within an auxiliary transmission casing that is affixed to said main casing and which encloses the exposed end of said output shaft.

11. A transmission mechanism as set forth in claim 10 further including overload release means interposed between the driving gear and the rear axle.

* * * * *